United States Patent [19]

Schroeder

[11] 4,204,193

[45] May 20, 1980

[54] ADAPTIVE ALIGNMENT FOR PATTERN RECOGNITION SYSTEM

[75] Inventor: Eugene N. Schroeder, Lexington, Ky.

[73] Assignee: International Business Machines Corporation, Armonk, N.Y.

[21] Appl. No.: 957,634

[22] Filed: Nov. 3, 1978

[51] Int. Cl.$^2$ .............................................. G06K 9/04
[52] U.S. Cl. ............................................ 340/146.3 H
[58] Field of Search .............. 340/146.3 H, 146.3 ED, 340/146.3 Q

[56] References Cited

U.S. PATENT DOCUMENTS

| | | | |
|---|---|---|---|
| 3,160,855 | 12/1964 | Holt | 340/146.3 ED |
| 3,223,973 | 12/1965 | Chatten | 340/146.3 H |
| 3,231,860 | 1/1966 | Chatten | 340/146.3 H |
| 3,295,105 | 12/1966 | Gray et al. | 340/146.3 H |
| 3,506,807 | 4/1970 | Malaby | 340/146.3 H |
| 3,613,081 | 10/1971 | Morimoto | 340/146.3 H |
| 4,034,343 | 7/1977 | Wilmer | 340/146.3 H |
| 4,110,737 | 8/1978 | Fahey | 340/146.3 Q |

Primary Examiner—Leo H. Boudreau
Attorney, Agent, or Firm—George E. Grosser

[57] ABSTRACT

A pattern recognition system in which the visual image of the scanned character or pattern is placed within a defined area, referred to as a video space, which contains ideally only picture elements associated with the character to be recognized. Initial alignment of the visual image in the video space is made by one of several prior art techniques (e.g., mark on the form). The pattern of picture elements in this video space are analyzed to determine what the visual image represents and the coded representation of this character is transmitted to associated equipment which includes apparatus for specifying the ideal coordinates or position of the recognized visual image in the video space. To aid in alignment of subsequent visual images in the video space, selected alignment features of the analyzed visual image are computed and these selected features are compared with ideal feature alignment values for the particular character being recognized. The differences between the selected feature values and the ideal feature alignment values are used as alignment correction values for subsequent characters to be aligned in the video space. The recognition of these subsequent characters is more accurate because of the enhanced alignment of the visual images in the video space.

9 Claims, 8 Drawing Figures

ADAPTIVE ALIGNMENT FOR PATTERN RECOGNITION SYSTEM

BACKGROUND OF THE INVENTION

I. Field of the Invention

This invention relates to a pattern recognition system, and more particularly to a method and apparatus for more accurately aligning characters before a recognition process.

II. Description of the Prior Art

In pattern recognition systems, if the visual image of the pattern or character being recognized is not properly aligned with respect to recognition apparatus, errors in recognition can occur. The visual image is in the form of a series of resolution elements that are electrical in form. The portion of the scanned area, containing ideally only the pattern to be recognized, is placed within a defined area (referred to as a video space) where it is recognized.

There are many known techniques for aligning the visual image in the video space. Vertical alignment is generally termed registration and horizontal alignment is referred to as segmentation. One alignment method depends completely on mechanical placement of the visual image in the video space. An examination of white space around each character in the video space serves as a guide for alignment in yet another alignment technique. Moreover, an averaging technique can be used for alignment whereby one or more features (e.g., the baseline and edge) of the scanned image are selected and averaged. The averaged features are then used to align the scanned image in the video space.

The problem with all of the above-described alignment techniques is that errors for subsequent characters to be recognized are not predicted and adjustments are not made to the alignment apparatus to compensate for the errors. For example, the first scanned character may be positioned sufficiently correct in the video space for recognition. However, there may be a slight skew in the scanned line with respect to the line of travel of the scanner. As the scanner progresses over the line, the skew increases with each character that is scanned. With conventional alignment techniques, each character in this skewed line of characters has to be individually aligned. After a character is aligned and recognized, the process begins again for each subsequent character in the scanned line of characters. In the conventional alignment techniques discussed, no alignment information is carried over for subsequent character alignment. Consequently, time is lost in making the same alignment corrections as recognition progresses along the scanned line.

It is apparent that alignment in the horizontal direction is needed for each character, in addition to vertical alignment, when the pitch of the characters is not the same as the pitch of the box-like video space. The increased horizontal alignment adds to the time needed to align each character in the video space. Again, total recognition time will be increased because no alignment information from prior recognized characters is utilized to align and recognize remaining characters in a scan.

OBJECTS OF THE INVENTION

It is a principle object of this invention to ease and enhance the alignment accuracy of each character in a video space for recognition as a recognition process progresses along a scanned line.

It is another object of this invention to utilize alignment information from prior recognized characters to align subsequent characters in the video space.

SUMMARY OF THE INVENTION

The above objects are accomplished by the adaptive alignment of characters or patterns based upon alignment information determined for previously recognized characters. In character recognition systems, the character or pattern to be recognized is scanned and the visual image thereof is converted into a series of resolution elements (referred to as PELs) in electrical form. The area scanned is generally larger than the area required for the character to be recognized to allow for inaccuracies in the scanning equipment. During recognition of a particular character, a selected portion of the scanned area is placed into a defined area called a video space which ideally contains only the PELs associated with the character to be recognized. The pattern of PELs contained in this video space is then analyzed by one or more means to determine which visual image is represented by the electrical image and the resultant coded recognized representation of this character is transmitted to auxiliary equipment.

The ease and accuracy of the analysis of the visual image in the video space is highly dependent upon the accurate alignment of the visual image in the video space. In line with the aforementioned objects of the invention, this invention improves the alignment of the visual image in the video space by using the features of prior recognized characters to aid in the recognition of subsequent characters. Initial alignment of the visual image is accomplished by one of several known alignment techniques. Alignment features are computed for the image in the video space and the character is thereafter recognized. The computed alignment features are compared with an ideal feature alignment (which is stored in the pattern recognition system for each character that is to be recognized) and the differences become alignment correction values for the next character to be placed and aligned in the video space by the particular prior art alignment technique. Consequently, each subsequent character is more accurately aligned in the video space to thereby enhance the ease and reliability of pattern recognition, and automatically adjust for cumulative errors in the scanning system.

DESCRIPTION OF THE PREFERRED EMBODIMENT

Figure 1:
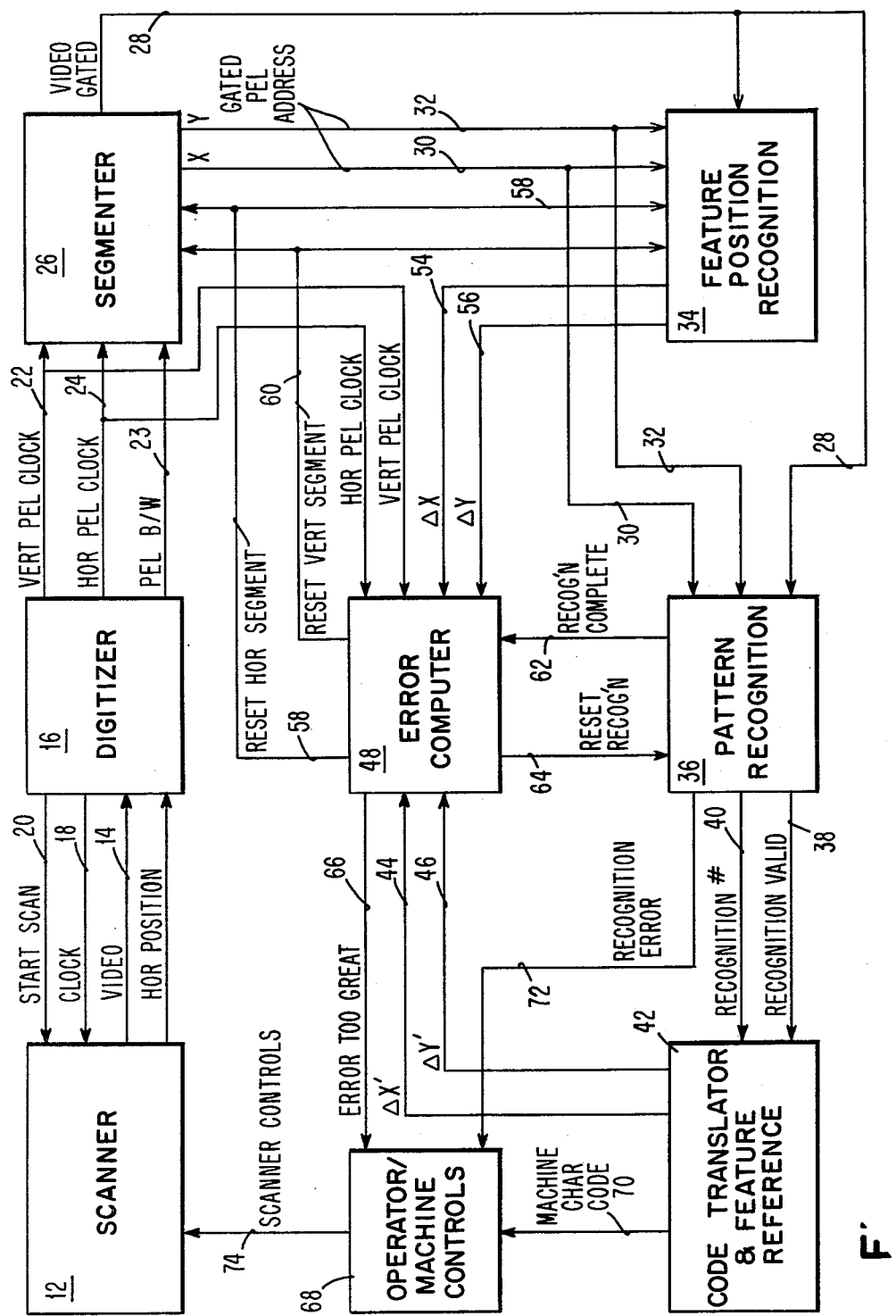
FIG. 1 is a schematic block diagram illustrating an embodiment of a pattern recognition system used in conjunction with the improved pattern alignment technique of this invention.

In FIG. 1, an OCR scanner and associated apparatus is illustrated in block diagram form. The OCR configuration includes a line scanner 12, of conventional design, which scans characters to be recognized by one of several techniques well known in the art. The area scanned is generally larger than is required for the character to be recognized. An analog video signal output on line 14 from scanner 12 is converted into digital video signal form in digitizer 16. Clocking and scan start signals are provided to scanner 12 by digitizer 16 over lines 18 and 20, respectively. In addition to an output to scanner 12, digitizer 16 provides an output in the form of vertical and horizontal picture element (hereinafter referred to as PEL) clocking information on lines 22 and 24, respectively, to segmenter 26. The PEL input information on line 23 to segmenter 26 is in the form of black/white elements and defines whether the visual PEL in question in blacker or whiter than a reference level. Initially, to allow for inaccuracies in the scanning equipment, the area scanned is generally larger than is required to recognize the scanned character.

Figure 8:
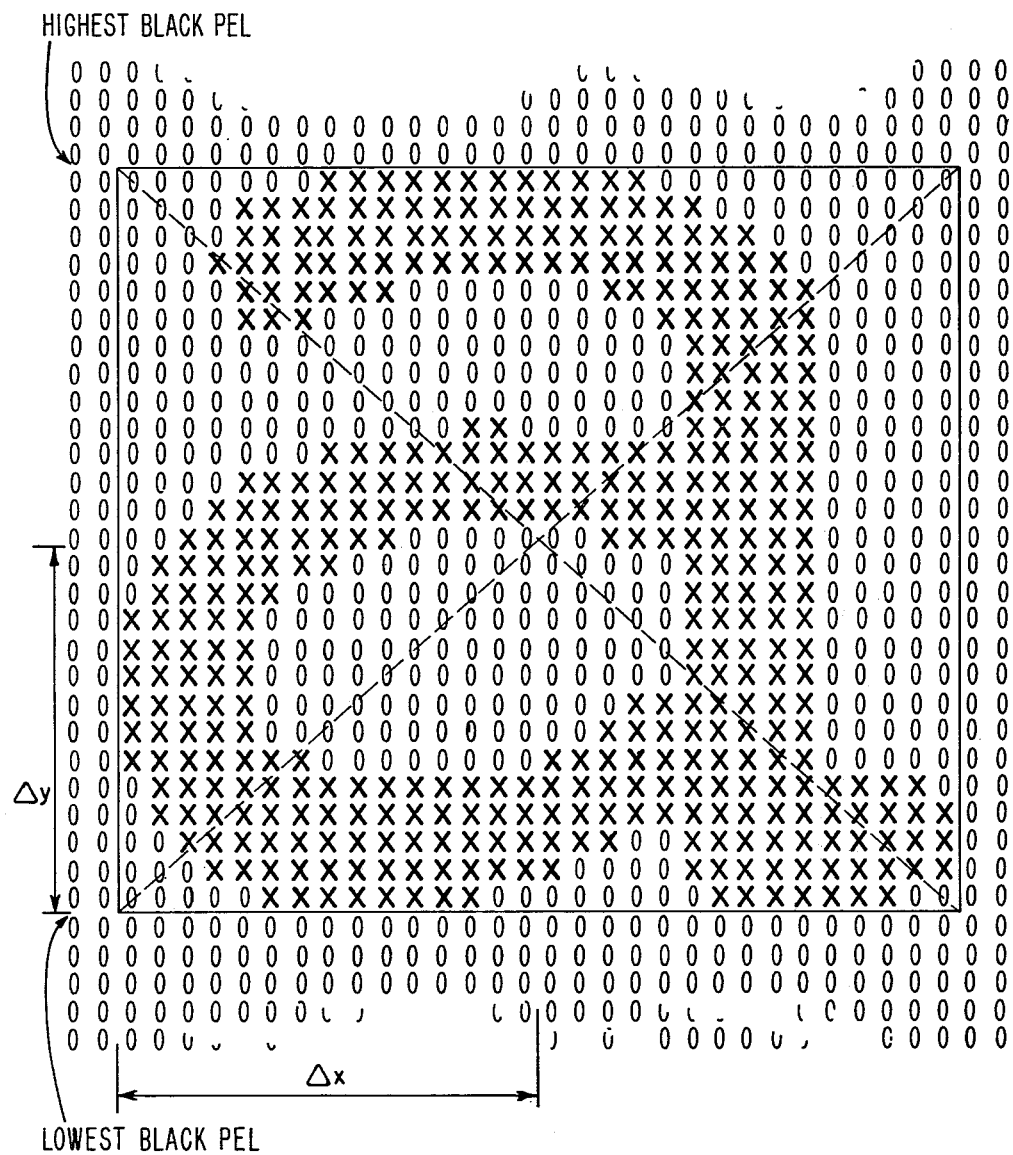
FIG. 8 illustrates an exploded pictorial representation of one visual character image bounded in a video space.

In segmenter 26, the complete field of view of the scanner is gated to provide a video space with a character to be analyzed properly located therein. In FIG. 8, a lowercase "a" is shown within video space 27. One "corner" of the video space (e.g., the lower left corner of the video space shown in FIG. 8) is selected as the origin. The PELs in the video space are referenced to that origin in the x (horizontal) and y (vertical) directions (e.g., a PEL with a coordinate of x=10, y=20, would be located 10 columns to the right and 20 rows up from the lower left corner of the video space shown in FIG. 8).

Gating begins with reset signals from error computer 48 on lines 58 and 60 which define the x and y origins of the video space. Thereafter, each PEL clock signal on lines 22 and 24 advances a corresponding counter in the segmenter 26 until the upper or rightmost boundary of the video space is reached. At this point, the gating of the video output on line 28 is inhibited until the respective counter in segmenter 26 is reset by the reset signal on lines 58 and 60. As the counters are advanced, their outputs are the PEL address which is in turn provided to the feature and pattern recognition logic 34 and 36, respectively, via lines 30 and 32.

Once segmenter 26 has placed the pattern of PELs within the video space, this pattern is then analyzed to determine which visual image is represented by the PELs in the video space. Recognition of the character is dependent upon accurate alignment of the visual image within the video space. This accurate alignment is the subject of this invention and will be discussed hereinafter.

The feature position recognition logic functional unit 34 is also activated by the segment reset signal on lines 58 and 60. One or more of a number of positional features may be recognized by this logic. A simple example of this would be the "box center" or "center of blackness" feature position recognition technique depicted in FIG. 3. FIG. 4 illustrates the "center of gravity" feature position recognition technique.

Figure 3:
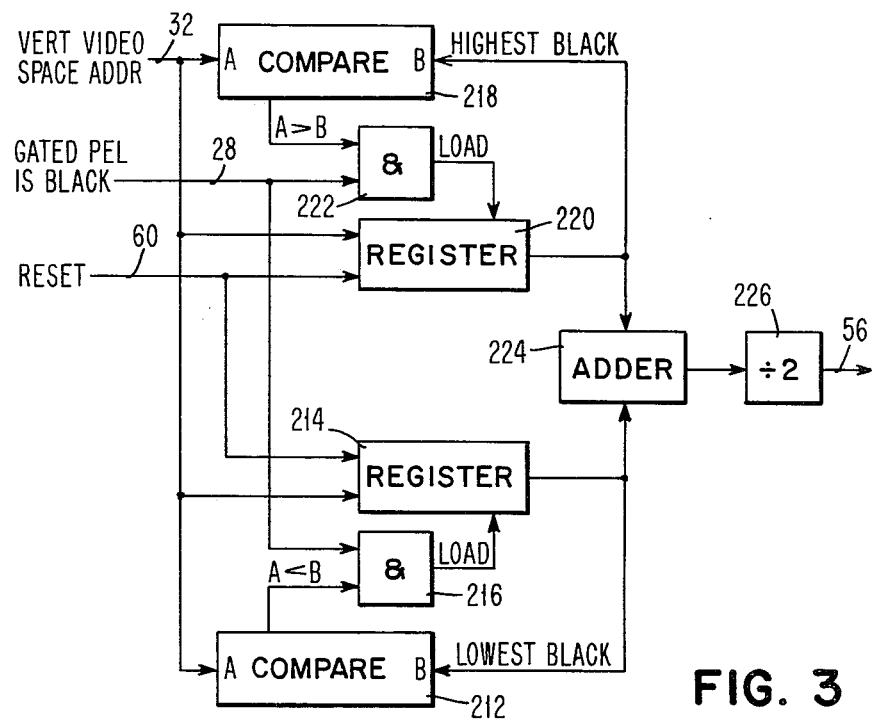
FIGS. 3 and 4 are alternate illustrations of logic for the feature position recognition block shown in FIG. 1.
Figure 4:
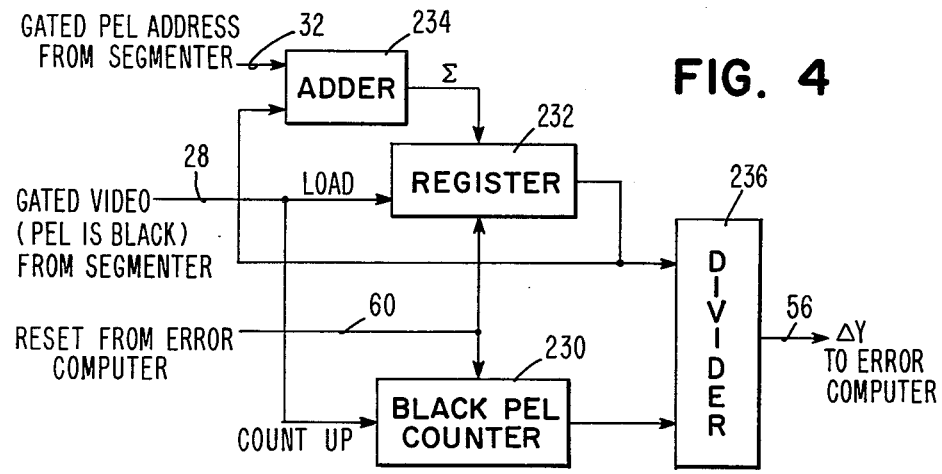

In the "box center" implementation depicted in FIG. 3, the highest and lowest PEL address containing a black PEL is averaged in both the x and y directions. Consequently, the resulting $\Delta x$ and $\Delta y$ address coordinates appearing on lines 54 and 56, respectively, represent the x, y positions of the box drawn around the extremities of the character to be recognized. This technique is illustrated in FIG. 8. Other methods can provide the same function (i.e., the distance of the selected feature of the character from the origin of the video space).

The gated PEL address on lines 30 and 32 and the gated video information on line 28, corresponding to the information at the address discussed above, are also supplied to the pattern recognition logic functional unit 36. Functionally, the purpose of the pattern recognition logic is to determine from the locations of the black and white PELs in the video space which of a number of possible patterns is represented. Again, a number of prior art techniques may be utilized as functional equivalents. The balance of the system however presupposes "on the fly" or real time processing of the input data, and as a consequence, relatively high speed recognition is required. One such high speed recognition method is referred to as matched correlation. For purposes of illustration, a matched correlator is set forth in FIG. 5 and will be discussed hereinafter.

The recognition process is started upon receipt of a reset signal on line 64, as shown in FIG. 1, from error computer 48. Output signals are recognition complete on line 62; recognition valid on line 38, or, in the alternative, recognition error on line 72; and the recognition number (usually referred to as "class") of the pattern recognized on the line denoted as numeral 40 which inputs functional block 42.

Functional block 42 contains the normal code translator function for converting from the internal class code to an external information interchange code (e.g., AS-CII, EBCDIC, or some other chosen code) that is transmitted over line 70 for use by operator/machine controls 68. Moreover, for each class code, the ideal location in the video space of the selected feature (e.g., center of box) may be determined beforehand and stored in the feature reference memory portion of block 42. Functional block 42 consists mainly of ROM. This ideal feature location information is relayed to error computer 48 via lines 44 and 46. Accordingly, when the recognized character information is transmitted to the external equipment, the ideal location of that character is transmitted to error computer 48.

The error computer, denoted by block 48 in FIG. 1, controls the order and times of system reset in order to provide for optimum positioning of the character in the video space. If there were no errors, the horizontal segmenter counter, as discussed above, would be reset at a fixed count from the origin of a given video space as would the vertical over lines 58 and 60, respectively. If there is an error between the ideal coordinate and the measured coordinate, counts are added or substracted such that the new references are displaced from the error-free location by the error or some fraction of it. To this extent, it may be seen that the registration and segmentation of a subsequent character or pattern will be modified by the error present in the character being recognized, thereby preventing errors from accumulating.

In normal operation, corrections are small since only small variations can occur from one character to the next. If a large error is indicated, it is very probable that an error has been made in the recognition process. This error signal is transmitted over line 66 to operator/machine controls 68. A normal response of controls 68 at this time would be a command over line 74 to scanner 12 to rescan the character in question.

Figure 2:
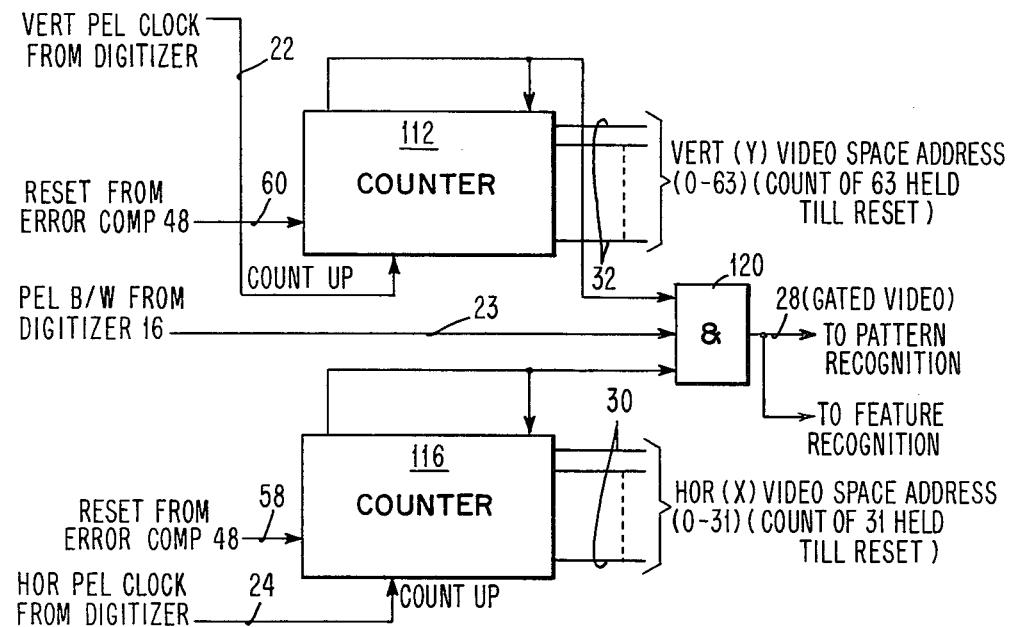
FIG. 2 is a logic implementation of the segmenter block shown in FIG. 1.

The aforementioned functions of segmenter 26 are carried-out by the hardware implemented in FIG. 2. Segmenter 26 contains two similar sections, one for vertical reference and the other one for horizontal reference. The vertical section contains a non-overflowing counter 112 which counts from 0 (the reset condition) to a maximum value (e.g., 63 or binary 111111), whereupon, further counting is inhibited until reset. (Other maximum counts may be obtained by conventional logic not shown).

When uninhibited, the counter is incremented by the vertical PEL clock on line 22. Operation begins by receipt of a reset pulse from error computer 48 on line 56. This pulse resets counter 112 to 0, thereby placing the counter in a state free of inhibition. The next 63 vertical PEL clocks (each corresponding to a vertical resolution element) are allowed to output via line 52 and the address of each element in the vertical (y) coordinate of the video space is given by the output of counter 112 on line 32.

The operation of the horizontal section of segmenter 26 is similar; however, the maximum count on lines 30 from counter 116 would generally be smaller (e.g., 31 instead of 63) since its value corresponds to the horizontal coordinate of the video space.

A video output is desired only when the area being scanned is within the area defined as the video space. This holds true when both counters are uninhibited. At this time, the PEL black/white decision on line 23, from digitizer 16, is gated by AND gate 120 to provide the gated video output on line 28.

In FIG. 3, one form of logic implementation of the feature position recognition block, denoted by numeral 34 in FIG. 1, is illustrated. The feature position recognition process in this figure determines the coordinates of the center of a box drawn around the extremities of the character or pattern. For purposes of simplicity, only the vertical information portion is described; the horizontal being similar in form and function.

As with segmenter 26, operation begins with a reset signal over line 60 from error computer 48 at the 0-0 origin of the video space. This resets registers 214 and 220 to 0. The outputs of registers 214 and 220 are compared with the vertical (y) address from segmenter 26 on line 32 by means of logic comparators 212 and 218. If the video space address is higher than the one in register 220 for a black PEL, AND gate 222 causes the contents of register 220 to be replaced with the new vertical address. If the address is lower than the one stored, the stored value is retained in register 220. Thus, at the end of the video space, the vertical address of the highest black PEL in the video space will be retained in register 220. The operation of register 214 and AND gate 216 is similar, except that the reversed outputs from comparator 212 cause the lowest black PEL address to be retained.

The outputs of registers 214 and 220 are added together in adder 224 and divided by 2 (a shift in the output wires) in circuit 226. The final output available on wire 56 is the sum of the highest and lowest black PELs divided by 2 or the vertical box center ($\Delta y$).

A second preferred feature recognition system is illustrated in FIG. 4. This system finds the "center of gravity or blackness" of the character. As in FIG. 3, operation begins with a reset from the error computer 48 on line 60 to define the origin of the video space. Thereafter, each black PEL causes the vertical address information on line 32 to be added to the sum of the addresses via adder 234 and holding register 232. The total number of black PELs is counted by black PEL counter 230. The vertical coordinate of the center of blackness may therefore be found by dividing the summed address (sum of moment arm x weight) by the number of black PELs (sum of weight) in divider 236. The output ($\Delta Y$) of divider 236 is on line 56. Again, the logic for the horizontal portion is similar in form and function.

Figure 5:
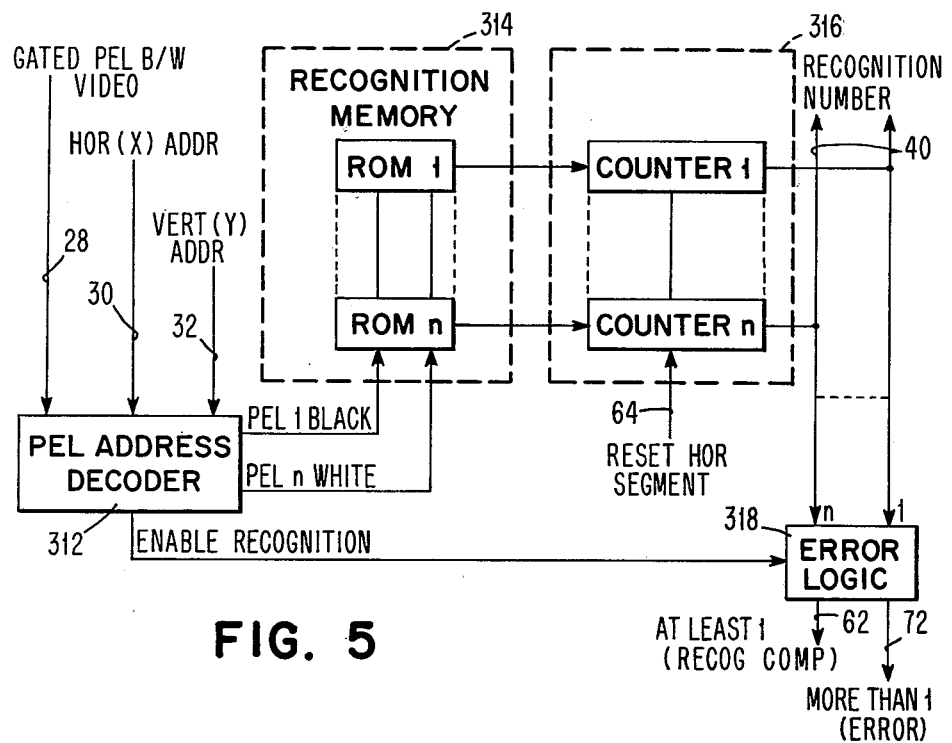
FIG. 5 is an illustration of logic for the pattern recognition block shown in FIG. 1.

In FIG. 5, one form of a pattern or character recognition system is illustrated. The recognition process utilized in this system is known as parallel mask matching. The PEL address x and y coordinates on lines 30 and 32, respectively, are combined with the gated video output on line 28 in the PEL address decoder 312 in order to double the number of addresses in the video space (i.e., double the product of $63 \times 31$). These addresses are applied to read only memory (ROM) array 314 which contains a word for each class of character to be recognized. The ROM is programmed such that the word with the largest number of 1's in the output corresponds to the character to be recognized. Counter array 316 is reset at the origin of the video space and thereupon accumulates the "1" outputs from each word of the ROM.

The mask programmed into the ROM and the size of the counters are such that for a properly recognized character one and only one of the counters 316 has its last stage set. The counter outputs are applied in parallel to the code translator 42 and error logic 318. The conventional error logic determines if at least one of the outputs from counters 316 is active and that not more than one is active at the time recognition is enabled by virtue of a high PEL address. If more than one is active, an error has been made (i.e., two or more characters have been recognized for the same input) and this error condition is transmitted to operator/machine controls 68 via line 72.

Figure 7:
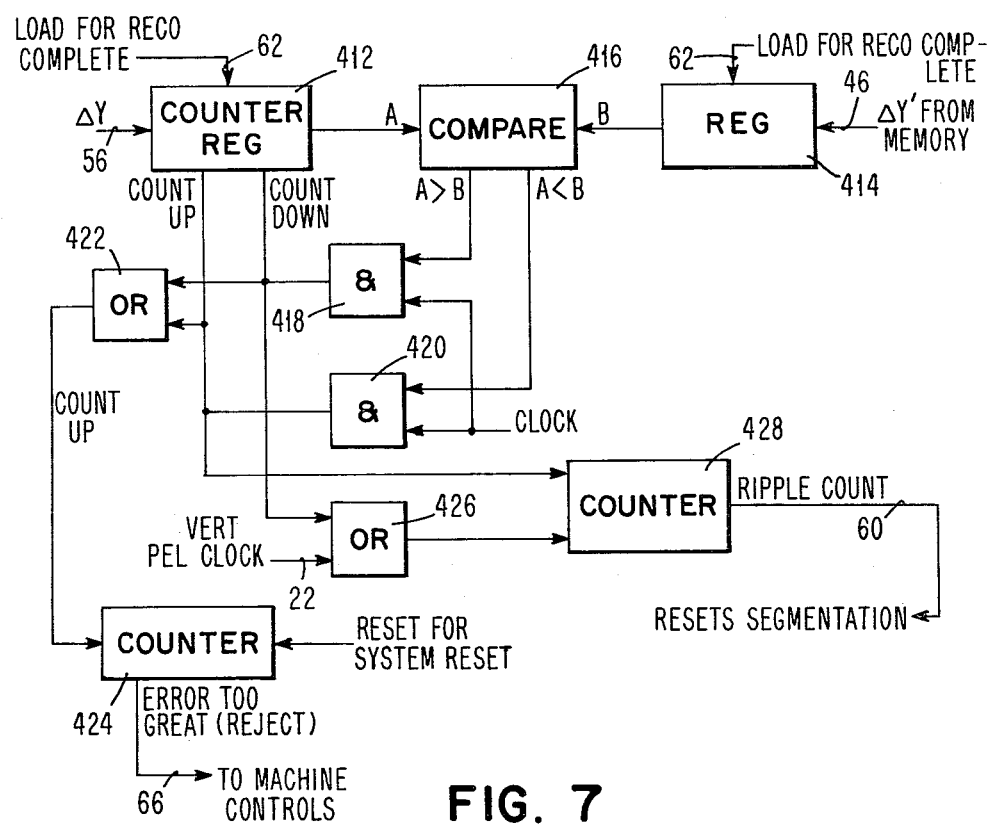
FIG. 7 illustrates the logic incorporated into the error computer of FIG. 1.

In FIG. 7, the logic implementation of error computer 48 is illustrated. Counter 428 is adapted to provide an output on line 60 upon receipt of the same number of input pulses as there are vertical PELs (e.g., 128) in the entire field of view of scanner 12. If there were no errors, and the counter was started at 0 upon the start of a scan, the output on line 60 would occur at the start of each scan through the gating of the vertical PEL clock on line 22 through OR gate 426.

Figure 6:
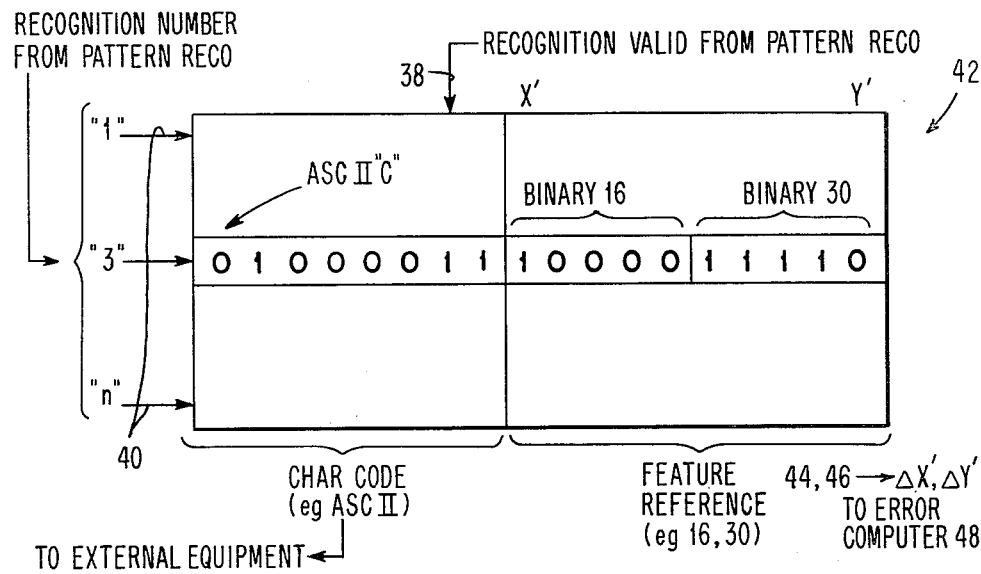
FIG. 6 is a logic implementation of the code translator/feature reference shown in block diagram form in FIG. 1.

For a valid character recognition signal on line 62, counter-register 412 is loaded with the $\Delta Y$ signal from feature recognition unit 34 over line 56. At the same time, the ideal Y coordinate $\Delta Y'$ for the character being recognized is placed in register 414 via line 46 from the feature reference memory portion of the functional block represented in FIGS. 1 and 6 by numeral 42. The outputs of registers 412 and 414 are logically compared in magnitude comparator 416. If the actual value $\Delta Y$ does not agree with the ideal value $\Delta Y'$, counter 412 is counted up or down via AND gates 418 and 420 until the difference is reduced to zero (0). The same up/down pulses applied to counter 412 are also applied to counter 428 independently of the vertical PEL clock. These pulses extend or shorten the time of output 60 with respect to the start of the scan. Since output 60 resets the vertical segment counter 112 in FIG. 2, to define the y origin of the video space, the y origin of the video space will be shifted up or down by the number of counts added to or subtracted from counter 428. The counts required for agreement between registers 412 and 414 may be accumulated in counter 424 by passing the outputs of gates 418 and 420 through an OR gate 422. If the error is so large as to be unreasonable for a correctly recognized character, an output on line 66 may be utilized to cause the scanner to rescan and/or cause the recognized character to be ignored in subsequent processing.

The horizontal section of error computer 48 is likewise similar in form and function to the vertical section. Differences are found in the length of the horizontal counter which is adapted to provide an output on line 58 in FIG. 1 of the segmentation distance (i.e., distance between characters). Since this pulse also denotes the start of the next character, it is utilized to reset the counters in the balance of the system (e.g., feature position recognition logic 34 and pattern recognition logic 36 via line 64, as seen in FIG. 1). Obvious variations include presetting of counter 428 to preset video space coordinates on system start up; altering the correction taken for an error (e.g., one-half the error or one PEL/character); filtering the error response such that a phase locked loop is simulated; and, only using the error as an aid to recognition rather than feedback to the video space coordinates.

While the invention has been particularly shown and described with reference to an illustrative embodiment thereof, it will be understood by those skilled in the art that the foregoing and other changes in form and detail may be made therein without departing from the spirit and scope of the invention. In particular, within the current state of the art, the majority of the functions shown as logic blocks could probably be implemented by a special or general purpose computer.

What is claimed is:

1. In a pattern recognition system including means for scanning a space to define discrete elemental areas for recognition of individual patterns, said system including means for associating said areas with respective signal levels corresponding to a measured characteristic, the improvement characterized by:
    means for identifying a pattern among a predefined set of recognizable patterns, said identifying means including means for storing pattern identity information for respective members of said set of recognizable patterns based on a predefined alignment in the scanning space and means for comparing the identity information with said signal levels to identify a recognizable pattern from said set thereof;
    means for measuring the coordinates of one or more selected alignment features based on said signal levels for the respective areas;
    means for storing ideal feature alignment coordinates for each recognizable pattern;
    means for computing the differences between the measured feature coordinates and the ideal feature coordinates for a recognizable pattern that has been identified by said identifying means; and
    means for adjusting the coordinates of a subsequent space for scanning in accordance with said coordinate differences to enhance the pattern alignment capabilities of the pattern recognition system.

2. The pattern recognition system of claim 1 wherein said storing means includes a read only memory (ROM) array with pattern identifying masks programmed therein, each said mask representing signal levels at various of said areas for a respective recognizable pattern in said predefined alignment.

3. The pattern recognition system of claim 1 wherein the means for measuring the alignment features of a pattern to be recognized measures the extreme horizontal and vertical coordinate values of the discrete areas associated with a particular signal level and averages the respective pairs of coordinate values to arrive at horizontal and vertical "center of box" alignment values, horizontal and vertical being two perpendicular reference directions in the plane of said scanning space.

4. The pattern recognition system of claim 3 further including registers for storing the addresses of both the horizontal and vertical coordinate values of each discrete area;
    the addresses stored in said registers being averaged to derive the "center of box" alignment value.

5. The pattern recognition system of claim 1 wherein the differences between the measured coordinates and the ideal coordinates for the pattern to be recognized are computed by logically comparing the horizontal and vertical measured coordinates that are accumulated and temporarily stored in a counter-register with the temporarily stored ideal horizontal and vertical coordinates from said means for storing the ideal alignment coordinates;
    said means for computing further including a counter for accumulating the number of counts needed for agreement between said measured and said ideal coordinates, and a counter for counting the horizontal and vertical differences in count between said measured and said ideal coordinates.

6. The pattern recognition system of claim 5 wherein the count from said counter for accumulating the number of counts needed for agreement between said measured and said ideal coordinates is an indication of the alignment error of the pattern in the scanning space.

7. The pattern recognition system of claim 1 wherein said elemented areas are associated with signal levels that correspond to either a black or white characteristic; and
    the alignment features of the pattern to be recognized are measured by storing the addresses of each of the black picture elements of said series of resolution elements and dividing the summed address by the total number of black picture elements of said series of resolution elements.

8. In a pattern recognition system including means for converting a scanned pattern into a series of resolution elements, means for separating the resolution elements into discrete areas for recognition of individual patterns and means for producing a pattern signal corresponding to a measured characteristic for the respective areas, the improvement characterized by:
    means for measuring the coordinates of one or more selected alignment features of said scanned pattern based on said pattern signal;
    means for identifying a standard pattern from a predefined set thereof, said identifying means including means for storing respective identifier signals for said standard patterns and means for comparing said identifier signals with said pattern signal to establish a pattern identity;
    means for storing ideal alignment coordinates for each standard pattern to be recognized; and
    means for computing the differences between the measured coordinates and the ideal coordinates for the identified pattern.

9. The improvement according to claim 8 further including means for causing a reject signal to be generated if said measured coordinates differ from said ideal coordinates by a predetermined amount.

* * * * *